United States Patent
Leonardus van Tooren et al.

(10) Patent No.: US 12,122,097 B2
(45) Date of Patent: *Oct. 22, 2024

(54) 3D PRINTING SYSTEM NOZZLE ASSEMBLY FOR PRINTING OF FIBER REINFORCED PARTS

(71) Applicants: University of South Carolina, Columbia, SC (US); Tighitco, Inc., Atlanta, GA (US)

(72) Inventors: Michael Johannes Leonardus van Tooren, Elgin, SC (US); Wout De Backer, Columbia, SC (US); Arturs Peteris Bergs, Cayce, SC (US)

(73) Assignees: University of South Carolina, Columbia, SC (US); Tighitco, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,082

(22) Filed: May 11, 2023

(65) Prior Publication Data
US 2023/0278284 A1 Sep. 7, 2023

Related U.S. Application Data

(63) Continuation of application No. 16/043,421, filed on Jul. 24, 2018, now Pat. No. 11,745,421.
(Continued)

(51) Int. Cl.
*B29C 64/20* (2017.01)
*B29C 64/112* (2017.01)
(Continued)

(52) U.S. Cl.
CPC .......... *B29C 64/209* (2017.08); *B29C 64/112* (2017.08); *B29C 64/227* (2017.08);
(Continued)

(58) Field of Classification Search
CPC ... B29C 64/209; B29C 64/112; B29C 64/245; B29C 64/393; B29C 64/227;
(Continued)

(56) References Cited

U.S. PATENT DOCUMENTS 10,293,591 B2    5/2019  Nielsen-Cole et al.
10,730,232 B2 *  8/2020  Guillemette .......... B29C 64/106
(Continued)

FOREIGN PATENT DOCUMENTS

CN    106313496     * 12/2018  ............ B33Y 30/00
CN    106313496 B    12/2018
WO    WO 2015/107309 A1  7/2015

OTHER PUBLICATIONS

CN106313496 English translation prepared May 29, 2024 (Year: 2024).*
(Continued)

*Primary Examiner* — Alison L Hindenlang
*Assistant Examiner* — Shibin Liang
(74) *Attorney, Agent, or Firm* — Christopher M. Scherer; DeWitt LLP

(57) ABSTRACT

Disclosed herein is a system for printing a three-dimensional object. The system can include at least one nozzle assembly configured to receive a continuous fiber and at least partially encase the continuous fiber with a polymer material to create a composite material. The nozzle assembly can also include a liquefier assembly that is operable coupled to a nozzle, (Continued)

which is configured to allow for the controlled deposit of the composite material while minimizing or eliminating tension exerted on the continuous fiber.

46 Claims, 10 Drawing Sheets

Related U.S. Application Data

(60) Provisional application No. 62/536,226, filed on Jul. 24, 2017.

(51) Int. Cl.
| | |
|---|---|
| *B29C 64/209* | (2017.01) |
| *B29C 64/227* | (2017.01) |
| *B29C 64/245* | (2017.01) |
| *B29C 64/295* | (2017.01) |
| *B29C 64/393* | (2017.01) |
| *B33Y 30/00* | (2015.01) |
| *B33Y 40/00* | (2020.01) |
| *B33Y 40/20* | (2020.01) |
| *B33Y 50/02* | (2015.01) |
| *B29C 70/38* | (2006.01) |

(52) U.S. Cl.
CPC .......... *B29C 64/245* (2017.08); *B29C 64/295* (2017.08); *B29C 64/393* (2017.08); *B33Y 30/00* (2014.12); *B33Y 40/00* (2014.12); *B33Y 40/20* (2020.01); *B33Y 50/02* (2014.12); *B29C 70/382* (2013.01)

(58) Field of Classification Search
CPC ....... B29C 70/382; B33Y 30/00; B33Y 40/00; B33Y 50/02; B05D 3/002
See application file for complete search history.

(56) References Cited

U.S. PATENT DOCUMENTS

| | | | |
|---|---|---|---|
| 10,953,609 | B1* | 3/2021 | Mark .................... B33Y 50/02 |
| 2014/0287139 | A1* | 9/2014 | Farmer ................ B29C 64/106 |
| | | | 118/695 |
| 2015/0096717 | A1 | 4/2015 | Batchelder et al. |
| 2015/0165666 | A1 | 6/2015 | Butchet et al. |
| 2015/0314531 | A1 | 11/2015 | Mark et al. |
| 2016/0176115 | A1 | 6/2016 | Becker |
| 2016/0236408 | A1* | 8/2016 | Wolf .................... B29C 64/118 |
| 2017/0057167 | A1* | 3/2017 | van Tooren ........... B29C 70/382 |
| 2019/0022935 | A1 | 1/2019 | Leonardus Van Tooren et al. |

OTHER PUBLICATIONS

PCT International Search Report & Written Opinion dated Nov. 29, 2018, which issued for corresponding PCT Application No. PCT/US2018/043381.
Extended European Search Report for related application, EP 18837678.4, dated Mar. 30, 2021.

* cited by examiner

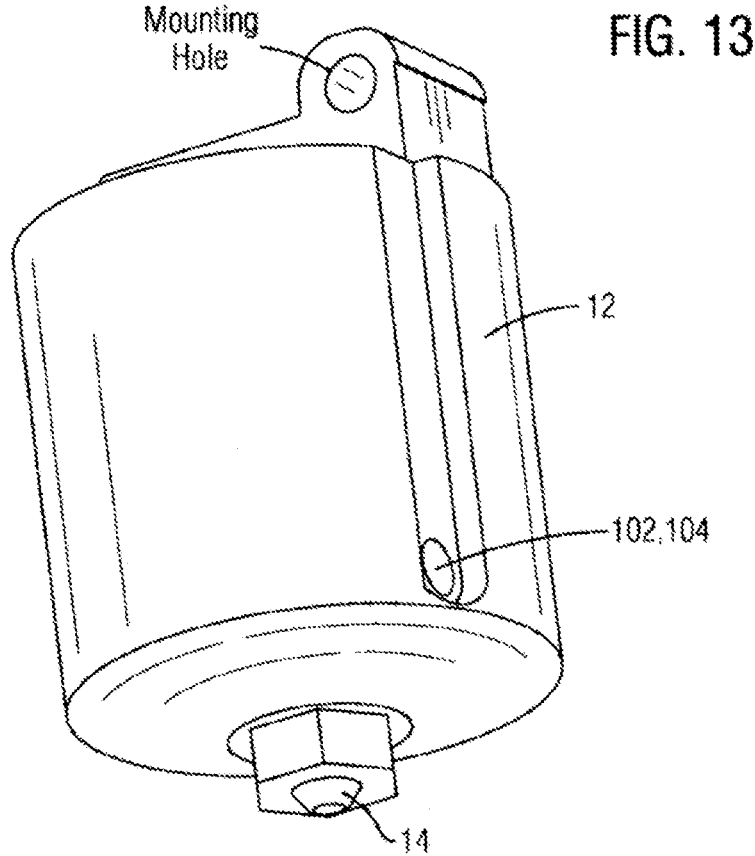
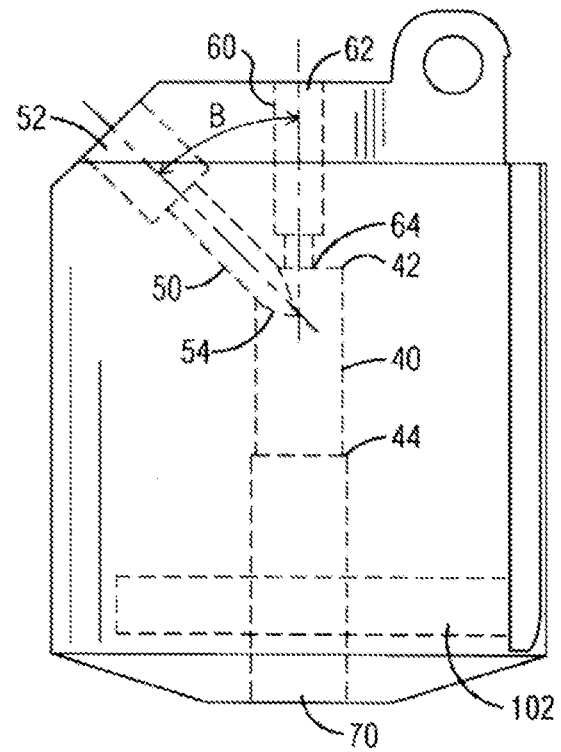

3D PRINTING SYSTEM NOZZLE ASSEMBLY FOR PRINTING OF FIBER REINFORCED PARTS

CROSS-REFERENCE TO RELATED APPLICATION

This application is a continuation of U.S. patent application Ser. No. 16/043,421, filed Jul. 24, 2018, and claims priority to U.S. Provisional Application No. 62/536,226, filed Jul. 24, 2017, of the same title, the contents of which are also incorporated by reference.

FIELD OF USE

This invention relates to integrated robotic 3D printing system for printing of continuous fiber reinforced parts. More particularly, the present disclosure relates to nozzle assemblies for use with an integrated robotic 3D printing system.

BACKGROUND

Three dimensional ("3D") printing is a process of making a three-dimensional solid object from a digital model. Typically, 3D printing is an additive process, when successive layers are built upon previous layers to "grow" the object. Generally, additive manufacturing refers to any method for forming a three-dimensional ("3D") object in which successive layers of material are laid down according to a controlled deposition and solidification process. Such conventional methods include fused deposition modeling (also commonly referred to as 3D printing), which extrudes materials comprising liquids (e.g., polymeric melts or gels) and extrudable solids (e.g., clays or ceramics) to produce a layer, followed by spontaneous or controlled curing of the extrudate in the desired pattern of the structure layer. Other conventional additive manufacturing processes include depositing solids in the form of powders or thin films, followed by the application of energy and/or binders often in a focused pattern to join the deposited solids and form a single, solid structure having the desired shape. Generally, each layer is individually treated to solidify the deposited material prior to deposition of the succeeding layer, with each successive layer becoming adhered to the previous layer during the solidification process.

Unfortunately, while additive manufacturing technologies have become much more common and less expensive in recent years, the technology is primarily limited to formation of prototypes for proof of concept work, as the formed materials generally exhibit low strength, low durability, and/or lack UV stability characteristics. Attempts have been made to form higher strength composite structures, for instance by combining a high crystalline polymer with a lower crystalline polymer in a fused deposition process. While such attempts have provided some improvement in the art, room for further improvement exists. For instance, the characteristics of highly crystalline polymers are still less than what is desirable in many high strength applications.

In addition, high performance fiber/polymer composites are potentially transformative materials solution for a range of applications comprising aerospace and defense as they can have mechanical properties approaching that of steel at a fraction of the density. Such high performance fiber/polymer composites are typically produced via a labor intensive winding and hand layup process which is both costly and severely limits the control over the final component micro-meso structure. These processes also require tooling, significantly increasing development time and requiring design modifications to allow for tooling.

Because of limitations of current processing technologies that do not allow accurate spatial orientation of the fiber phase within the resin matrix and the limitations of the commercial resin systems employed which have neither the dynamic curing response or the rheological properties required to allow spatial orientation and constraint of a fiber during a printing process, there has been little progress in commercializing systems for additively manufacturing continuous fiber/polymer composites through any 3D printing process. On known system for fiber reinforced additive manufacturing is the MarkForged 3D™ system, which is described in United States Published Patent Application No. 2014/0361460 for methods for fiber reinforced additive manufacturing. This MarkForged 3D™ technology utilizes a thermoplastic polymer resin and relies on melt-flow processing of a thermoplastic coated fiber filament that is in-layed with the filament rather than being printed directly with the filament. The MarkForged 3D™ technology is restricted to a 3-axis system which prevents reinforcement non-orthogonal to the build direction, which weakens the interstitial bond strength and ultimately limits the strength, mechanical and thermal performance of the composite to something significantly below current aerospace grade thermoset resin high performance fiber/polymer composites systems.

Accordingly, it would be desirable to develop methods and systems for the formation of high strength composites according to an additive manufacturing process and the composites formed thereby that allows for the control over the final composite product micro-meso structure and hence the performance, reliability and repeatability of the formed composite products. It is also desirable to use additive manufacture technologies to automate the production of high performance fiber/polymer composites and to allow new degrees of freedom and control over the fiber placement orientation and microstructure within the formed high performance fiber/polymer composites.

SUMMARY

The disclosure relates to a system for printing a three-dimensional object is provided. The system can include at least one nozzle assembly configured to receive a continuous fiber and at least partially encase the continuous fiber with a polymer material to create a composite material. It is contemplated that the nozzle assembly can be operatively coupled to the operative end of a robotic armature that can be configured to move in at least six different degrees of freedom. Optionally, a print bed can be provided which is configured to move in at least six different degrees of freedom.

The 3D print system can also include a nozzle assembly that is configured to allow for the controlled deposit of the composite material while minimizing or eliminating tension exerted on the continuous fiber. The nozzle assembly can include a liquefier assembly that is operable coupled to a nozzle. In one aspect, the liquefier assembly can define a melt chamber, a polymer conduit having a polymer inlet and a polymer outlet, and a fiber conduit having a fiber inlet and a fiber outlet. In one aspect, the nozzle assembly can be coupled to the operative end of a robotic armature.

The polymer inlet is in communication with a source of polymer, which can be fed into the polymer inlet at operator selective pressures or optionally under feedback control of the controller to a desired supply pressure. The fiber inlet is in communication with a source of the continuous fiber, which can preferably be fed to the under controlled tension. The fiber inlet can be defined in an upper surface of the liquefier assembly and the fiber outlet can be defined in the proximal end of the melt chamber.

In one aspect, the melt chamber can have a proximal end in communication with the fiber outlet and a distal end that is in communication with a nozzle bore defined in a bottom portion of the liquefier assembly.

The polymer conduit extends along a polymer longitudinal axis that extends downwardly at an acute angle β with respect to the longitudinal axis of the melt chamber. Optionally, the polymer longitudinal axis of the polymer conduit can be positioned offset from the longitudinal axis of the melt chamber to allow for a downward cyclonic clockwise motion of the pressurized polymer entering the melt chamber about the longitudinal axis of the melt chamber and toward the distal end of the melt chamber.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

A full and enabling disclosure of the present invention, comprising the best mode thereof, directed to one of ordinary skill in the art, is set forth in the specification, which makes reference to the appended FIGS., in which:

FIG. 13 shows a perspective view of the liquefier assembly of FIG. 12, without the heater jacket member attached.

FIG. 14 shows a side view of the liquefier assembly of FIG. 13, without the nozzle and heater jacket member attached, and showing a polymer inlet, a polymer conduit, a fiber inlet, a fiber conduit, a melt chamber in communication with the distal outlet ends of the respective polymer and fiber conduits, a nozzle bore in fluid communication with the distal end of the melt chamber, and a thermocouple bore, and showing the polymer conduit being positioned at an acute angle β with respect to a longitudinal axis of the melt chamber.

DETAILED DESCRIPTION

Figure 1:
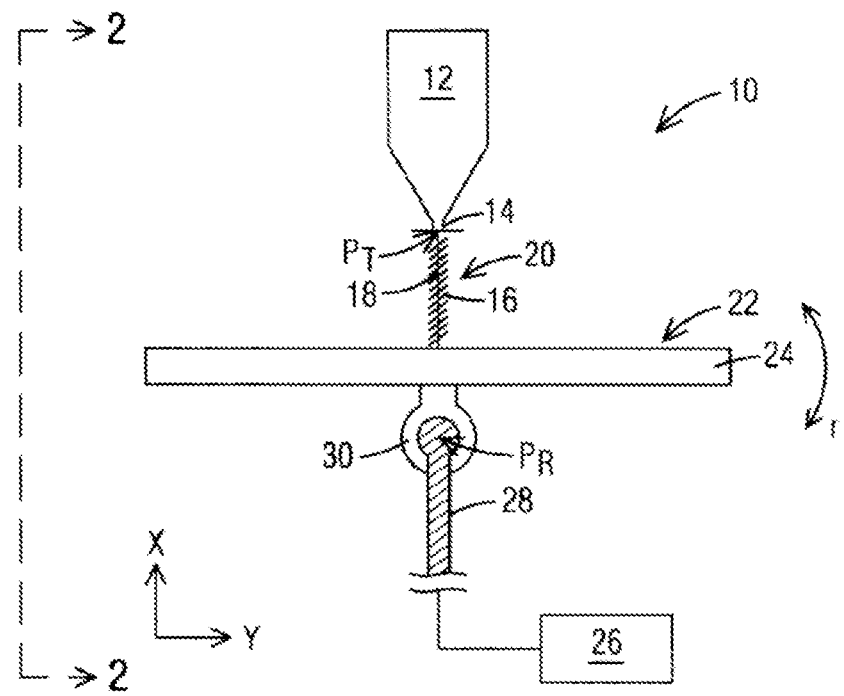
FIG. 1 shows a front view of an exemplary integrated robotic 3D print system having a print bed with at least 6 degrees of movement, independently controllable.
Figure 2:
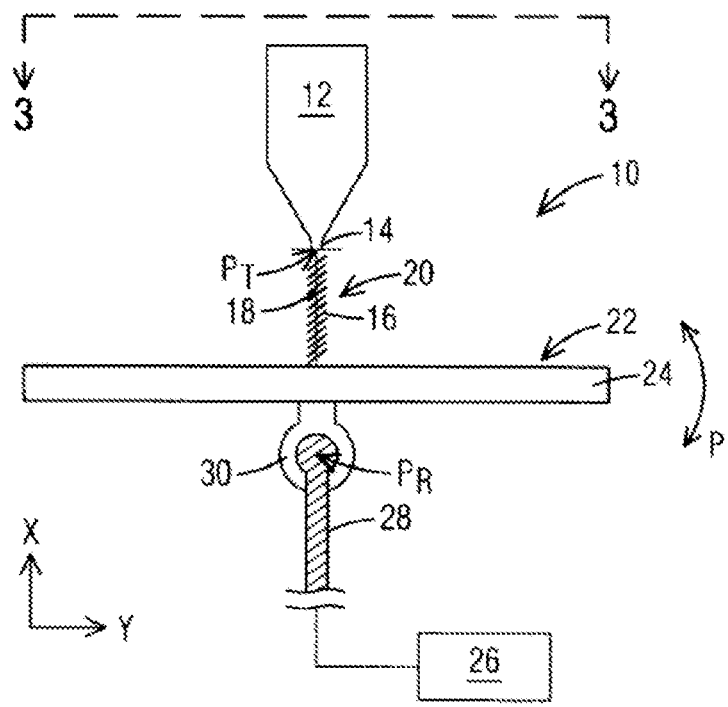
FIG. 2 shows a side view of the integrated robotic 3D print system of FIG. 1.
Figure 3:
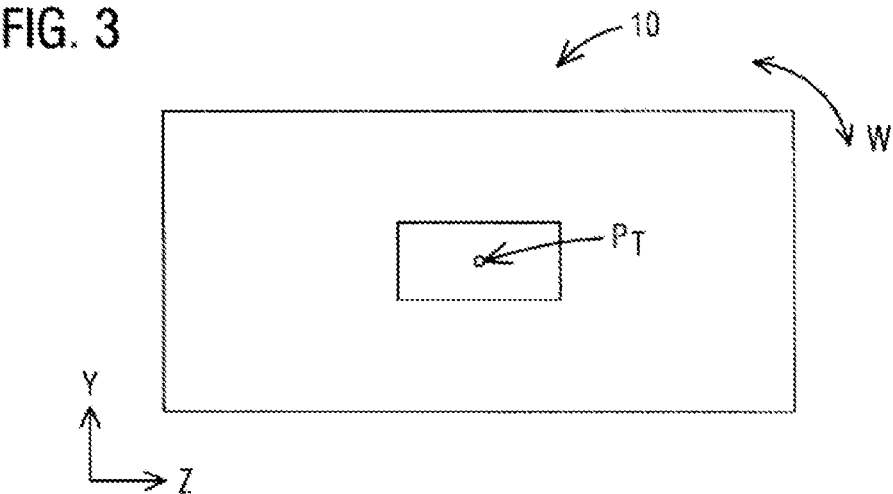
FIG. 3 shows a top view of the integrated robotic 3D print system of FIG. 1.

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "bore" includes aspects having two or more bores unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes examples where said event or circumstance occurs and examples where it does not.

In one aspect, a 3D printer system is generally provided, along with methods of its construction and use. Generally, the 3D printer system allows for printing of composite parts with continuous fibers in multiple directions and orientations, which can lead to the production of high performance fiber/polymer composite parts. Thus, the provided 3D printer system combines the advantages of traditional 3D printing using polymers with the strength and stiffness of composite parts produced with methods such as, for example, vacuum injection. It is contemplated that the 3D printer system is particularly suitable for printing ready-for-use duct work, conduit, tubing, piping, channeling, hollow-chambered fiber/polymer composite structures and other similar structures by addressing the stiffness, strength and durability shortcomings that would be associated with forming these parts with a conventional 3D printing technique, which would otherwise provide unreinforced polymer 3D printed parts. As an example, and without limitation, the provided 3D printer system can be used in applications to print thin-walled, complex shaped high performance fiber/polymer composite parts, which, heretofore could only be manufactured in a complex, multi-step process. Thus, the provided 3D printer system and processes allows the 3D printing of multi-axial high performance fiber/polymer composite parts with multiple degrees of print freedom, opening the possibility of printing high performance fiber/polymer parts with a continuous fiber reinforcement creating the required stiffness, strength and durability.

In one aspect, the 3D printer system 10 can utilize a six (6) Degrees of Freedom (or more, comprising at least seven degrees of freedom) system that allows the printing of fiber(s) in different directions and orientations relative to a plane perpendicular of a print bed, where in some instances, the fiber is a continuous fiber. By the term "6 Degrees of Freedom" refers to the freedom of movement in three-dimensional space of the end of a robotic armature or of the print bed onto which the fibers are printed. Specifically, the nozzle assembly can be operatively coupled to the end of a robotic armature or optionally, a print bed that has six (6) independently controllably movements: three translational movements and three rotational movements. The translational movements are up/down, left/right, and forward/backward, and the three rotational movements are typically referred to as pitch, roll, and yaw. The nozzle assembly can be fixed relative to some degrees of freedom, such as up/down, or alternatively also exhibit six degrees of freedom. In some embodiments, added degrees of freedom can be achieved by the introduction of a mandrel on the print bed to which composite material is applied. Orientation of the mandrel, itself, can be controlled relative to the print bed to provide added degrees of freedom (i.e., at least 7 degrees of freedom).

The various degrees of freedom of the robotic armature and/or print bed, and in some instances, the movement of an added mandrel, allow for complex introduction of fiber(s) and/or composite materials into and/or within a work piece (e.g., object, part component, and the like) above and beyond what is achievable by a standard 3D printer. Instead of introduction of a fiber and/or composite material in a stepped-fashion to a work piece, the orientation, elevation, angle, and the like of a fiber(s) and/or composite material can be varied during the printing process to create complex printed formations/shapes within the work piece. For example, the fiber(s) and/or composite material could be applied as the print bed is periodically or continuously altered in direction/orientation to create a complex pattern of fiber(s) and/or composite material, such as for example, a zigzag pattern in the work piece or bend or complex shape in the work piece that cannot be achieved by linear application of material as performed by traditional 3D printers. The continuous fiber(s) or composite material can even be twisted about itself by manipulation of the print bed and/or an alternative mandrel relative to the fiber(s) or composite material during application.

The figures show an exemplary system 10 having a nozzle assembly 11 that comprises a liquefier assembly 12 having a nozzle 14, having an extrusion tip defining a translational point PT. As described more detail below, the liquefier assembly 12 combines a polymer material 16 and a continuous fiber 18 to form a composite material 20. During printing, the composite material 20 is deposited, via the nozzle 14, onto the printing surface 22 of the print bed 24 and/or a mandrel 32 located on the printing surface, where the mandrel acts as a structural form to which the composite material is applied, and/or an existing work piece. In one aspect, the print bed 24 can be moveable, independently with at least 6 degrees of freedom, as controlled by the controller 26. As will be discussed later, the movement/ orientation of an optional mandrel can also be controlled relative to the print bed to provide added degrees of freedom for further complex printing. Optionally, the end of the robotic armature 13, to which the nozzle assembly is mounted, can be moveable, independently with 6 degrees of freedom, as controlled by the controller 26.

In addition, it is also contemplated that the system 10 can comprise multiple print beds that are each movable in six degrees of freedom and/or the nozzle assembly or multiple nozzle assemblies may be independently configured for one or more degrees of freedom (possibly 6 degrees of freedom), to thereby allow for further complex printing orientations.

In one aspect, it is contemplated that print bed 24 can be moveable in the x-direction (i.e., up/down with respect to the translational point PT), in the y-direction (i.e., laterally with respect to the translational point PT), and z-direction (i.e., cross-laterally with respect to the translational point PT). In one aspect, the print bed 24 can be moved translational, independently, by controller 26 using the arm 28 connected to the receiver 40 of the print bed 24. In particular embodiments, the arm 28 can be formed from multiple segments connected together at moveable joints (bending and/or rotating) to allow for translational movement of the print bed 24 with respect to the translation point PT.

Additionally, the print bed 24 can be rotationally movable can be rotationally movable about the rotational point PR to allow roll (r), pitch (p), and yaw (w) rotational movement. The print bed 24 can be rotated in any direction, independently, by controller 26 using the arm 28 connected to the receiver 40 of the print bed 24. Although shown as utilizing a rotation ball 29 coupled to the receiver 40, any suitable connection can be utilized.

In an optional aspect, it is contemplated that the operative end of the robotic armature 13, which is coupled to the nozzle assembly, can be moveable in the x-direction (i.e., up/down with respect to the translational point PT), in the y-direction (i.e., laterally with respect to the translational point PT), and z-direction (i.e., cross-laterally with respect to the translational point PT). The operative end of the robotic armature can be conventionally signaled by controller 26. It is contemplated that the robotic armature is a conventional computer controlled multi-axis robotic armature to allow for translational movement of the operative end of the robotic armature with respect to the translation point PT.

Figure 4:
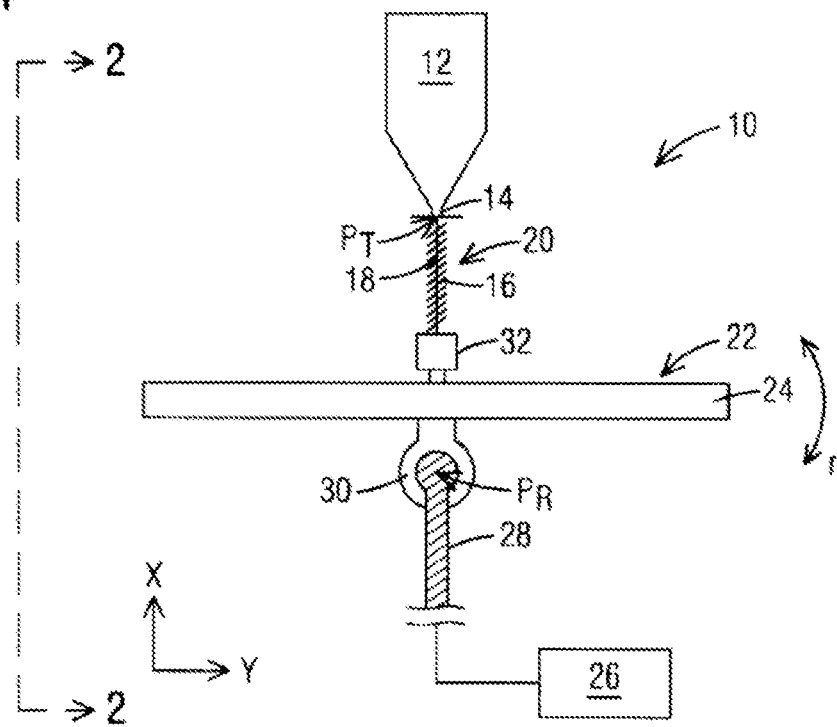
FIG. 4 shows a side view of a prototype set-up of the integrated robotic 3D print system employing a mandrel connected with the print bed.
Figure 5:
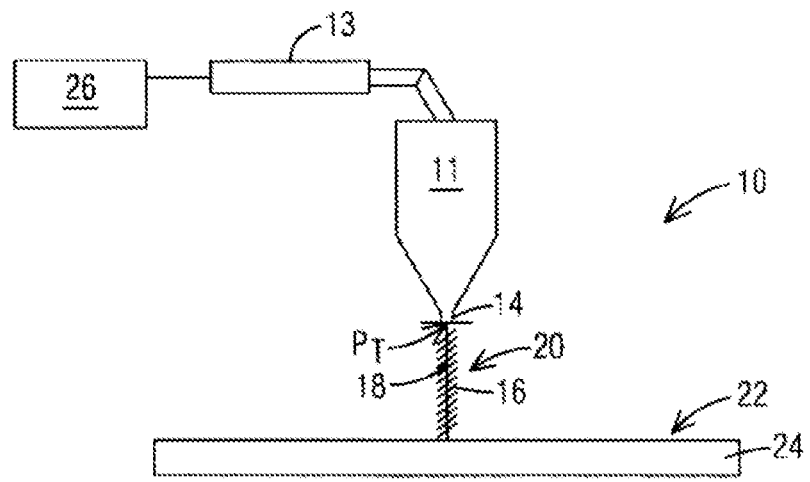
FIG. 5 shows a front view of an exemplary integrated robotic 3D print system having a robotic armature with at least 6 degrees of movement, independently controllable, which is coupled to a nozzle assembly.
Figure 6:
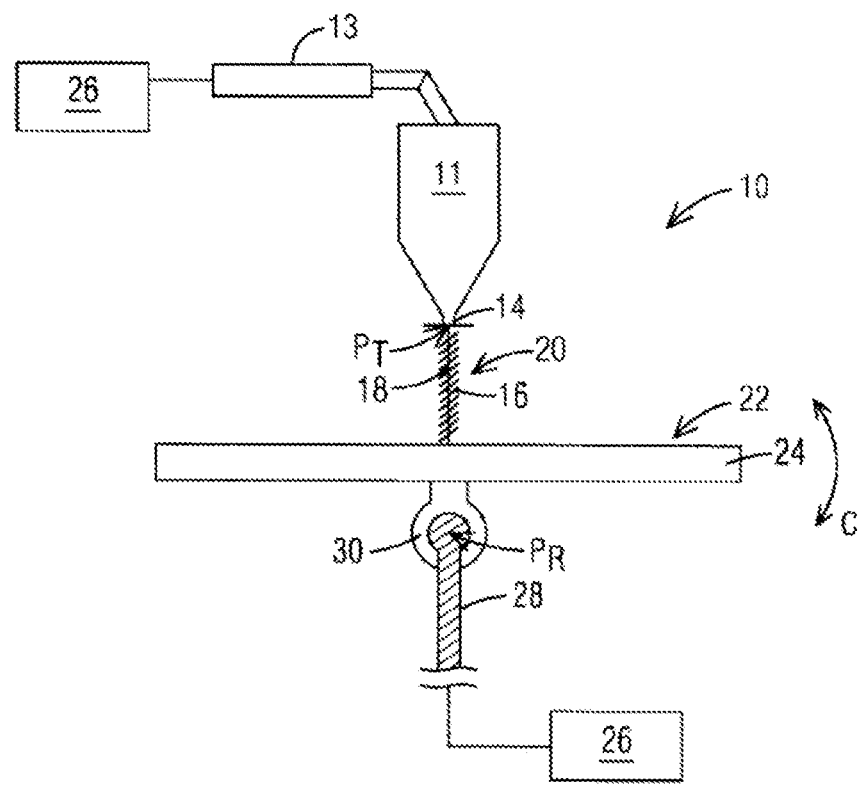
FIG. 6 shows a front view of an exemplary integrated robotic 3D print system having a robotic armature with 6 at least degrees of movement, independently controllable, and a print bed with 7 degrees of movement, independently controllable, and showing an end of the robotic armature coupled to a nozzle assembly.
Figure 7:
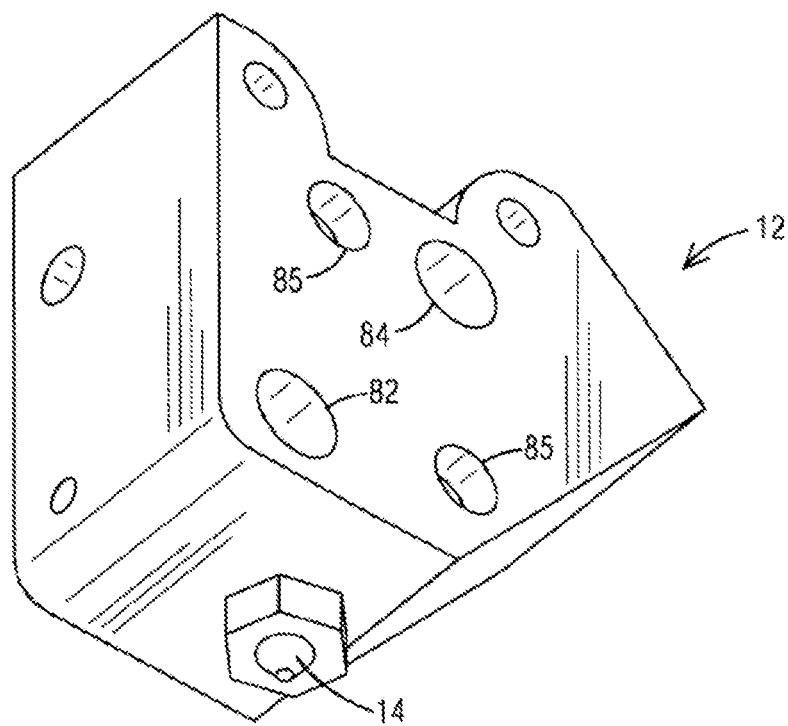
FIG. 7 shows a perspective view of a nozzle assembly of the integrated robotic 3D printing system, showing a nozzle coupled to an output orifice of a liquefier assembly.
Figure 8:
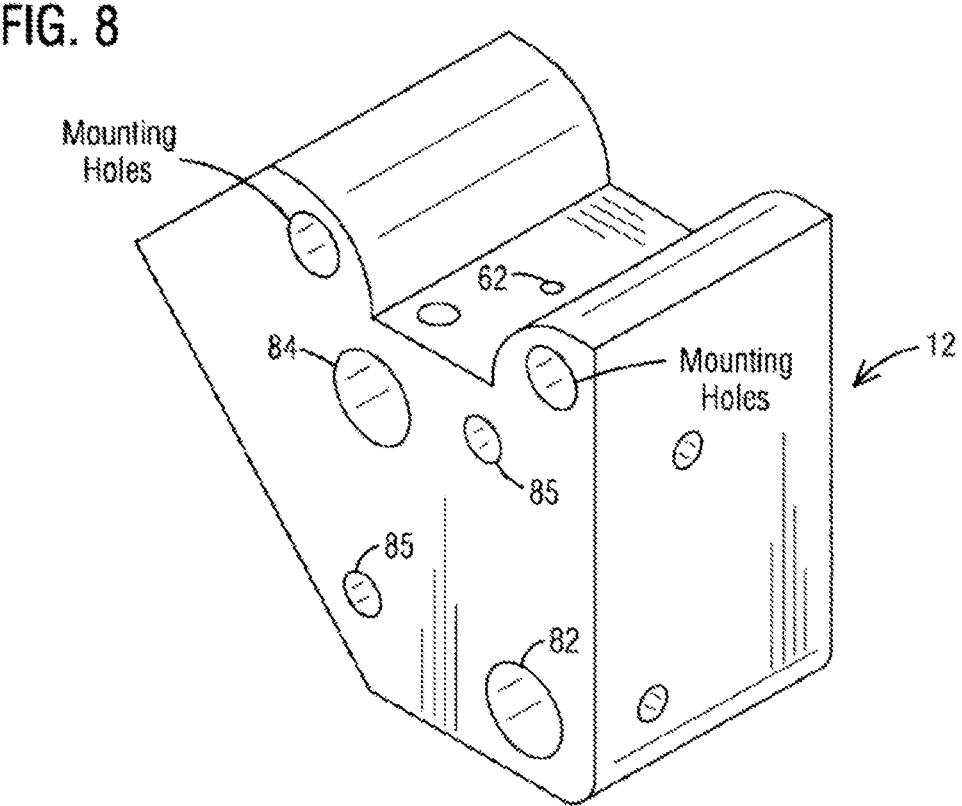
FIG. 8 shows a perspective view of the liquefier assembly of FIG. 7, without the nozzle attached.
Figure 9:
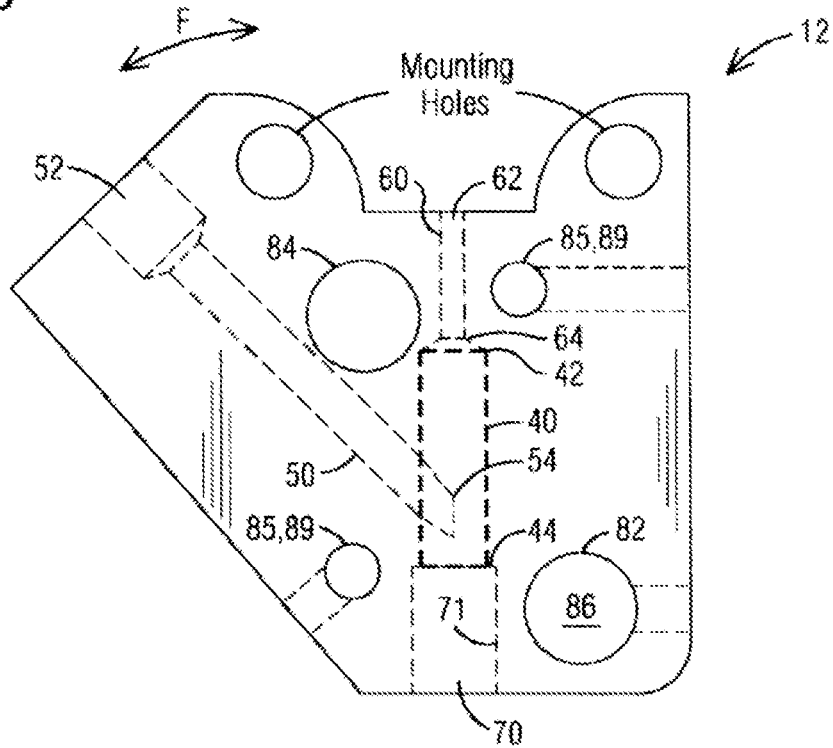
FIG. 9 shows a side view of the liquefier assembly of FIG. 7, without the nozzle attached, and showing a polymer inlet, a polymer conduit, a fiber inlet, a fiber conduit, a melt chamber in communication with the distal outlet ends of the respective polymer and fiber conduits, a nozzle bore in fluid communication with the distal end of the melt chamber, respective preheat and nozzle heater cartridges, and respective preheat and nozzle thermocouples, and showing the polymer conduit being positioned at an acute angle β with respect to a longitudinal axis of the melt chamber.
Figure 10:
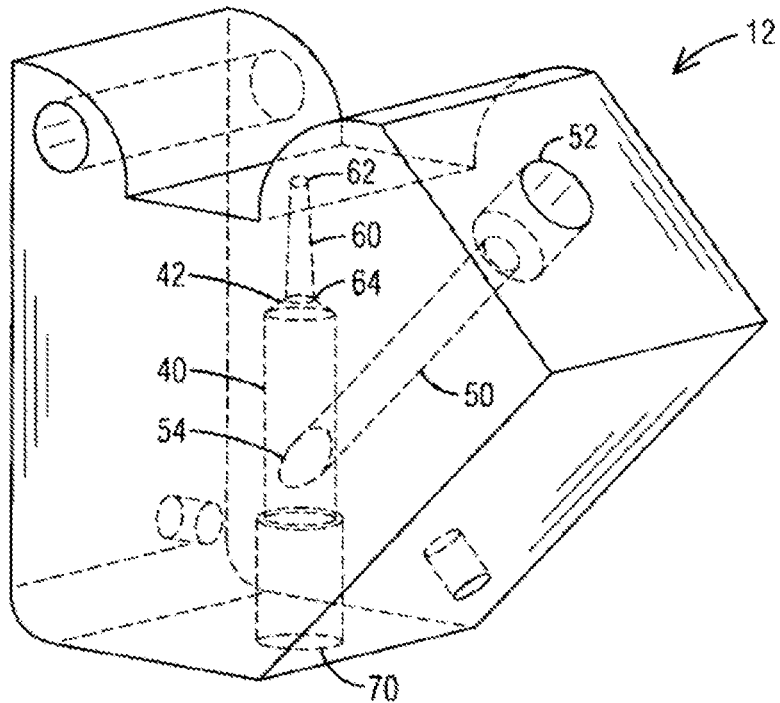
FIG. 10 shows a perspective view of the liquefier assembly of FIG. 7, without the nozzle attached, and showing a polymer inlet, a polymer conduit, a fiber inlet, a fiber conduit, a melt chamber in communication with the distal ends of the respective polymer and fiber conduits, and a nozzle bore in fluid communication with the distal end of the melt chamber.
Figure 11:
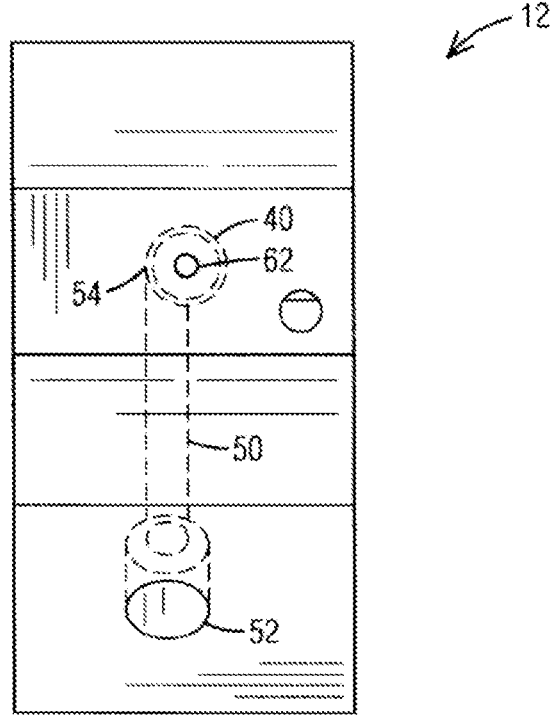
FIG. 11 shows a top elevational view of the liquefier assembly of FIG. 7, showing the polymer conduit positioned tangent to a longitudinal axis of the melt chamber.
Figure 12:
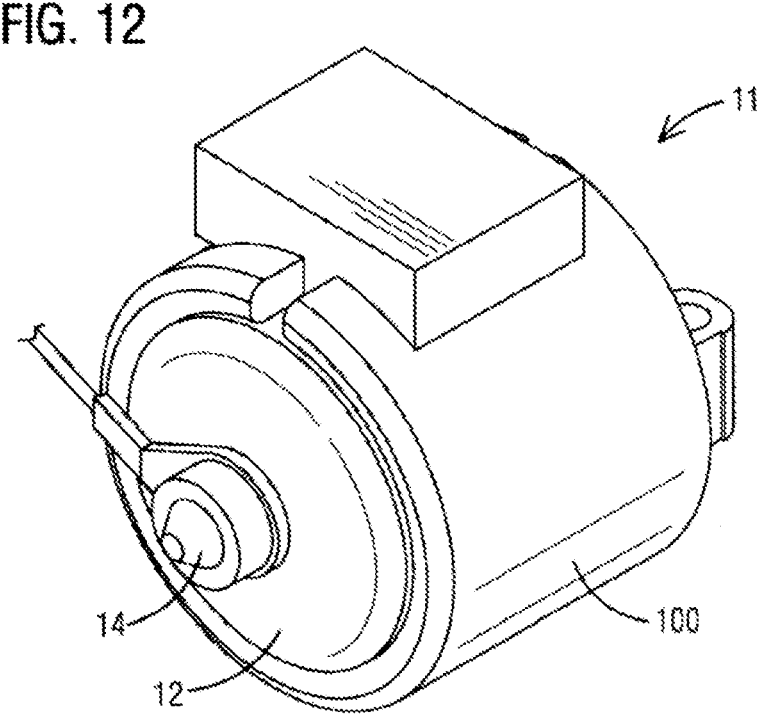
FIG. 12 shows a perspective view of a nozzle assembly of the integrated robotic 3D printing system, showing a nozzle coupled to an output orifice of a liquefier assembly and showing a heater jacket member positioned in overlying relationship thereon at least a portion of an exterior surface of the liquefier assembly.
Figure 15:
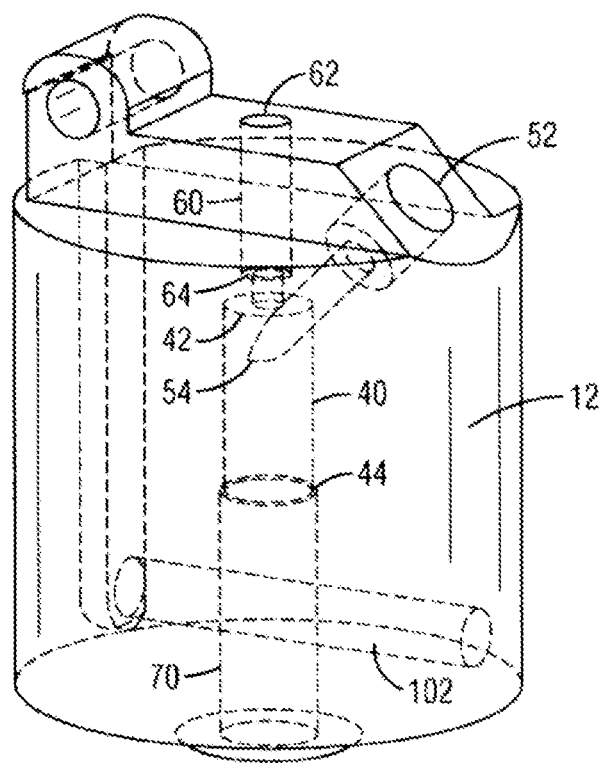
FIG. 15 shows a perspective view of the liquefier assembly of FIG. 12, without the nozzle and heater jacket member attached, and showing a polymer inlet, a polymer conduit, a fiber inlet, a fiber conduit, a melt chamber in communication with the distal ends of the respective polymer and fiber conduits, and a nozzle bore in fluid communication with the distal end of the melt chamber.
Figure 16:
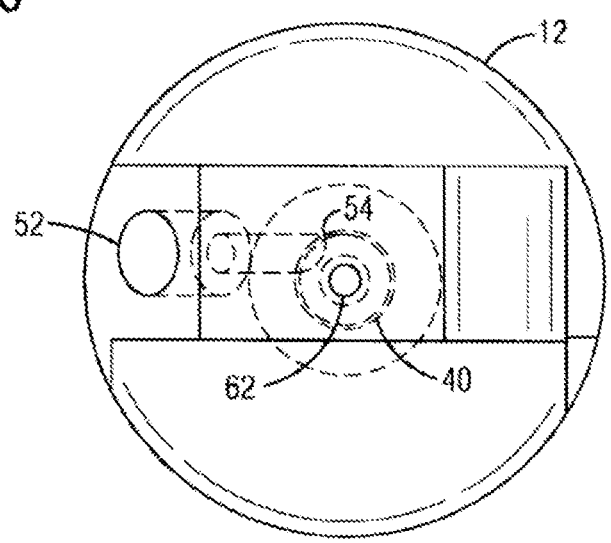
FIG. 16 shows a top elevational view of the liquefier assembly of FIG. 12, showing the polymer conduit positioned tangent to a longitudinal axis of the melt chamber.
Figure 17:
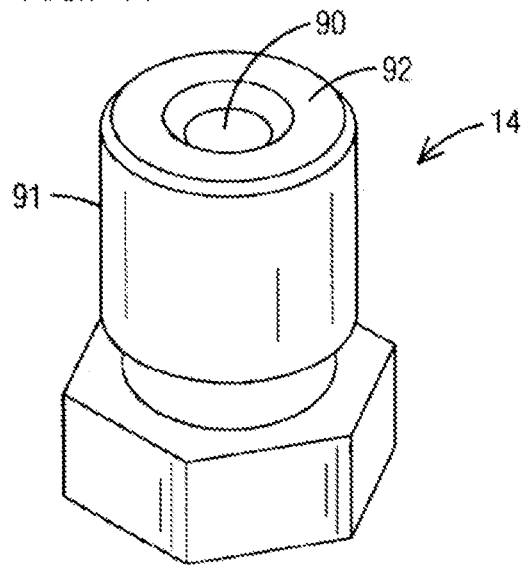
FIG. 17 shows a perspective view of the nozzle of FIG. 7.
Figure 18:
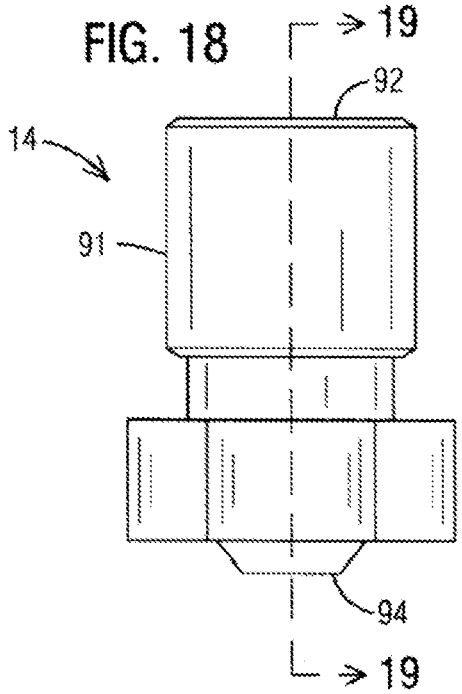
FIG. 18 shows a side elevational view of the nozzle of FIG. 17.
Figure 19:
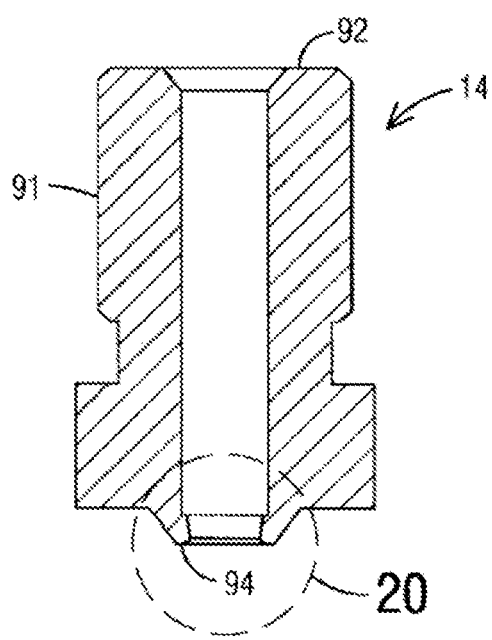
FIG. 19 shows a cross-sectional view of the nozzle taken across line 19-19 of FIG. 18.
Figure 20:
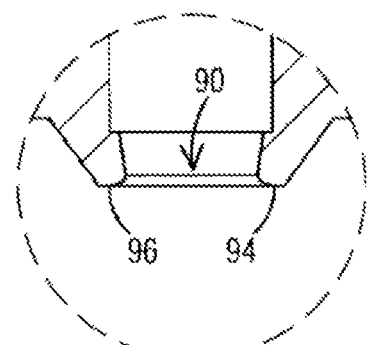
FIG. 20 shows an enlarged cross-sectional view of a distal end of the nozzle of FIG. 19.

As shown in FIG. 4, a mandrel 32 can be applied to the printing surface 22 of the print bed 24. The mandrel 32 can act as a structural form to which the fiber(s) and/or composite materials are applied to form the work piece. Optionally, the mandrel can be applied in a stationary manner to the printing surface and move with the print bed 24 of the printer. Optionally, the mandrel can be applied to a second printing surface or positioned on a moveable arm that is separate from the print bed 24, so that the mandrel is moveable relative to the print bed 24 to create further degrees of freedom beyond the six degrees of freedom achieved via the movable print bed. In a further optional aspect, added degrees of freedom can be achieved via use of multiple print beds that are each movable in six degrees of freedom relative to the base print bed 24, whereby controlled orientation of the base print bed 24 and controlled orientation of the added print beds creates further degrees of freedom.

In one aspect, the controller 26 can comprise a computer or other suitable processing unit. Thus, in several embodiments, the controller 26 can include suitable computer-readable instructions that, when implemented, configure the controller 26 to perform various different functions, such as receiving, transmitting and/or executing arm movement control signals.

A computer generally includes a processor(s) and a memory. The processor(s) can be any known processing device. Memory can include any suitable computer-readable medium or media, comprising, but not limited to, RAM, ROM, hard drives, flash drives, or other memory devices. The memory can be non-transitory. Memory stores information accessible by processor(s), comprising instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages can be used to implement the teachings contained herein. Alternatively, the instructions can be implemented by hard-wired logic or other circuitry, comprising, but not limited to application-specific circuits. Memory can also include data that can be retrieved, manipulated, or stored by processor(s).

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the arm 28, the rotation ball 29, and/or the liquefier assembly 12.

In one aspect, the controller 26 can include (or be in communication with a computer that includes) supporting software programs that can include, for example, computer aided design (CAD) software and additive manufacturing layering software as are known in the art. The controller 26 can operate via the software to create a three-dimensional drawing of a desired structure and/or to convert the drawing into multiple elevation layer data. For example and without limitation, the design of a three-dimensional structure can be provided to the computer utilizing commercially available CAD software. The structure design can then be sectioned into multiple layers by commercially available layering software. Each layer can have a unique shape and dimension. The layers, following formation, can reproduce the complete shape of the desired structure.

For example, it is contemplated that the printer can be accompanied with software to slice beyond the current xyz slicing methodology used in industry. For example, 3D objects other than 3D Cartesian objects, such as an isoparametric helically/spirally winded band around a duct, can be spirally sliced instead of sliced in a flat plane, to be able to spirally lay-down/print filament and/or slit tape/tow. Thus, the iso-parametrical slicing can be utilized with printing capability of the 6 degrees of freedom. On skilled in the art will appreciate that, in a traditional 3D printing system, the layer files are translated to nozzle assembly movements for applying material to a print bed to form the work piece. In the system disclosed herein, the layer files are also translated to print bed and/or mandrel movements to create the various layers and continuous thread patterns discussed herein via movement of the nozzle assembly and/or the mandrel.

Numerous software programs have become available that are capable of performing the presently specified functions. For example and without limitation, AUTOLISP can be used to convert AUTOCAD drawings into multiple layers of specific patterns and dimensions. CGI (Capture Geometry Inside, currently located at 15161 Technology Drive, Minneapolis, Minn.) also can provide capabilities of digitizing complete geometry of a three-dimensional object and creating multiple-layer data files. The controller 26 can be electronically linked to mechanical drive means so as to actuate the mechanical drive means in response to "x," "y," and "z" axis drive signals and "p," "r," and "w," rotation signals, respectively, for each layer as received from the controller 26.

As shown, the system 10 comprises a nozzle assembly 11 that is configured to allow for the controlled deposit of the composite material 20 while minimizing or eliminating tension exerted on the continuous fiber 18. Referring now to FIGS. 7-20, the nozzle assembly 11 can comprise a liquefier assembly 12 that is operable coupled to a nozzle 14. In one aspect, the liquefier assembly 12 can define a melt chamber 40, a polymer conduit 50 having a polymer inlet 52 and a polymer outlet 54, and a fiber conduit 60 having a fiber inlet 62 and a fiber outlet 64. The polymer inlet 52 is in communication with a source of polymer, which can be feed into the polymer inlet at operator selective pressures or optionally under feedback control of the controller to a desired supply pressure. The fiber inlet is in communication with a source of the continuous fiber 18, which can preferably be fed to the liquefier assembly under controlled tension.

In one aspect, the melt chamber 40 can have a proximal end 42 in communication with the fiber outlet 64 and a distal end 44 that is in communication with a nozzle bore 70 defined in a bottom portion of the liquefier assembly. The melt chamber extends longitudinally along a longitudinal axis of the melt chamber. In one aspect, the melt chamber can be preferably cylindrically shaped with a smooth interior surface to enhance the flow performance of liquefied polymer. In this aspect, the melt chamber can have a substantially constant diameter. Optionally, the melt chamber can have a frustoconical shape that narrows toward the distal end 44.

The fiber inlet 62 can be defined in an upper surface of the liquefier assembly 12 and the fiber outlet 64 can be defined in the proximal end 42 of the melt chamber 40. In one aspect, it is contemplated that a longitudinal axis of the fiber conduit 60 can be co-axial to the longitudinal axis of the melt chamber. The fiber conduit 60 is preferably cylindrically shaped with a smooth interior surface. In a further aspect, the diameter of the fiber conduit 60 can be substantially constant and can be less than the diameter of the melt chamber 40.

The polymer conduit 50 extends along a polymer longitudinal axis. In one aspect, the polymer conduit 50 can be preferably cylindrically shaped with a smooth interior surface to enhance the flow performance of liquefied polymer. In one aspect, and as shown in FIGS. 9-10 and FIGS. 14-15, the polymer longitudinal axis extends downwardly at an acute angle β with respect to the longitudinal axis of the melt chamber 40. In this aspect, the acute angle β can be between about 5 degrees to about 85 degrees, preferably between about 40 degrees to about 60 degrees, more preferred between about 40 degrees to 50 degrees, and most preferred about 45 degrees.

In a further aspect, and as shown in FIGS. 10-11 and FIGS. 15-16, the polymer longitudinal axis of the polymer conduit 50 can be positioned offset from the longitudinal axis of the melt chamber 40. It is contemplated that the polymer longitudinal axis can be offset from the longitudinal axis a distance proximate to the radius of the diameter of the fiber conduit 60. It is also contemplated that the polymer longitudinal axis can be offset from a plane bisecting the longitudinal axis at an acute angle. It will be appreciated that the offset of the polymer longitudinal axis and the acute angle β of the polymer longitudinal axis relative to the longitudinal axis of the melt chamber 40 allows for a downward cyclonic clockwise motion of the polymer entering the melt chamber about the longitudinal axis of the melt chamber 40 and toward the distal end 44 of the melt chamber.

In one aspect, the distal end of the polymer conduit can be defined in the interior surface of the melt chamber proximate a middle juncture 46 of the melt chamber 40. Optionally, the distal end of the polymer conduit can be defined in the interior surface melt chamber 40 in an upper portion 47 of the melt chamber or in a lower portion 48 of the melt chamber 40.

Optionally, the nozzle bore 70 of the liquefier assembly 12 is in fluid communication with the distal end of the melt chamber and can extend downwardly coaxial to the longitudinal axis of the melt chamber 40. The nozzle bore defines an interior surface 71 that is sized and shaped to receive the nozzle. In one aspect, at least a portion of the interior surface 71 can be treaded to complementarily receive a threaded exterior surface of the proximal end 72 of the nozzle 14.

In one exemplary aspect, and as shown in FIGS. 7-11, the liquefier assembly 12 further comprises a first internal bore 82 extending substantially transverse to the longitudinal axis of the melt chamber 40. As shown, it is preferred that the first internal bore 82 be positioned in a bottom portion of the liquefier assembly proximate to the distal end of the melt chamber 40 and the nozzle bore 70. In this aspect, the first internal bore 82 is sized and shaped to operatively receive a nozzle heater cartridge 86, which is configured, via heat transfer, to heat the areas of the liquefier assembly proximate the nozzle heater cartridge to a desired temperature such that the temperatures in the nozzle bore 70 and melt chamber 40 are maintained at a desired operating temperature.

Similarly, the liquefier assembly 12 can comprise a second internal bore 84 extending substantially transverse to the longitudinal axis of the melt chamber 40. As shown, it is preferred that the second internal bore 84 be positioned in adjacent to the polymer conduit, the fiber conduit, and the proximal end of the melt chamber. In this aspect, the second internal bore 84 is sized and shaped to operatively receive a preheat heater cartridge 88, which is configured, via heat transfer, to heat the areas of the liquefier assembly proximate the preheat heater cartridge to a desired temperature such that the temperatures in the polymer conduit, fiber conduit, and melt chamber are maintained at a desired operating temperature.

In another optional aspect, the liquefier assembly 12 can further comprises at least one thermocouple bore 85 extending substantially transverse to the longitudinal axis of the melt chamber 40 that is configured for receipt of a thermocouple (not shown). In this aspect, it is contemplated that the at least one thermocouple bore 85 can be spaced from the noted first and second internal bores 62, 64. As exemplarily shown, and without limitation, the at least one thermocouple bore 85 can comprise a nozzle thermocouple bore 87 spaced from the first internal bore 82 and a preheat thermocouple bore 89 that is spaced from the second internal bore 84. As one skilled in the art will appreciate, conventional thermocouples, such as, for example and without limitation, incased Type K thermocouples, can be mounted in the exemplary nozzle thermocouple and preheat thermocouple bores 87, 89. In this aspect, the system 10 can be configured to provide selectively or automatic feedback control to the respective preheat heater cartridge 89 and/or the nozzle heater cartridge 87 to maintain the desired operating temperatures in the liquefier assembly 12.

In an optional aspect shown in FIGS. 12-16, the liquefier assembly 12 can comprise a heater jacket member 100 that is positioned in overlying relationship thereon at least a portion of an exterior surface of the liquefier assembly. In this aspect, and as one skilled in the art will understand, the heater jacket member 100 is configured, via heat transfer, to heat the areas of the liquefier assembly proximate the heater jacket member to a desired temperature such that the temperatures in the nozzle bore and melt chamber are maintained at desired operating temperature(s). In one exemplary aspect, and without limitation, the liquefier assembly 11 can have a substantially cylindrical shape. In this aspect, the heater jacket member 100 can me mounted thereon the cylindrically shaped liquefier assembly 11 to circumferentially surround at least a portion of the exterior surface of the liquefier assembly. In a further exemplary aspect, the heater jacket member 100 can extend longitudinally substantially the entire elongate length of the liquefier assembly.

In this optional aspect, the liquefier assembly 11 can also comprise at least one thermocouple bore 102 that extends substantially transverse to the longitudinal axis of the melt chamber and that is configured for receipt of a thermocouple 104. In this aspect, the system is configured to provide selectively or automatic feedback control to the heater sleeve member 100 in response to the sensed temperatures to maintain the desired operating temperatures in the liquefier assembly.

In one aspect, the desired operating temperature can be between about 340 degrees C. to about 450 degrees C., preferably between about 360 degrees to about 420 degrees, and more preferred about 390 degrees C. One skilled in the art will appreciate that it is contemplated that the desired operating temperatures for the nozzle assembly can vary depending of the respective melt point of the supplied polymer material and or the polymer forming a portion of a composite filament, which is described in more detail below.

Referring now to FIGS. 17-20, the nozzle 14 defines a nozzle conduit 90 that extends longitudinally from a proximal end 92 to a distal end 94 of the nozzle 14. In one aspect, least a portion of the exterior surface 91 of the proximal end 92 of the nozzle 14 can be selectively treaded to be complementarily within the nozzle bore 70 of the liquefier assembly 12 such that the nozzle conduit 90 is placed into fluid communication with the distal end of the melt chamber 40. As shown, it is preferred that the nozzle conduit 90 extends substantially coaxial to the longitudinal axis of the melt chamber.

In one optional aspect, the nozzle conduit 90 can be cylindrically shaped with a smooth interior surface to enhance the flow of the fluidized polymer. In one aspect, the diameter of the nozzle conduit 90 can be substantially constant. In a further optional aspect, the nozzle conduit 90 can be inwardly tapered proximate the proximal end of the nozzle conduit 90 to reduce the diameter of the conduit to a second diameter. In this aspect, the second diameter can be less than the diameter of the melt chamber 40. Further, it is contemplated that the operative diameter of the nozzle conduit 90 can be inwardly tapered in a convergent zone in which the diameter of the nozzle conduit 90 is reduced from the second diameter to a third diameter as the nozzle assembly approaches the distal end of nozzle 14.

It is contemplated that an edge 96 of the distal end of the nozzle conduit 90 can have a chamfered or otherwise rounded cross-sectional shape to allow for the operative deposit of the composite material on the underlying object with minimal or no transmission of undesired tension onto the continuous fiber 18 of the deposited composite material 20 being extruded from the extrusion tip of the nozzle 14. In one aspect the diameter of the distal end of the nozzle conduit 90 can be between about 0.5 to about 2.5 mm, preferably between about 0.8 to about 2.0 mm, and most preferred about 1.5 mm.

Figure 21:
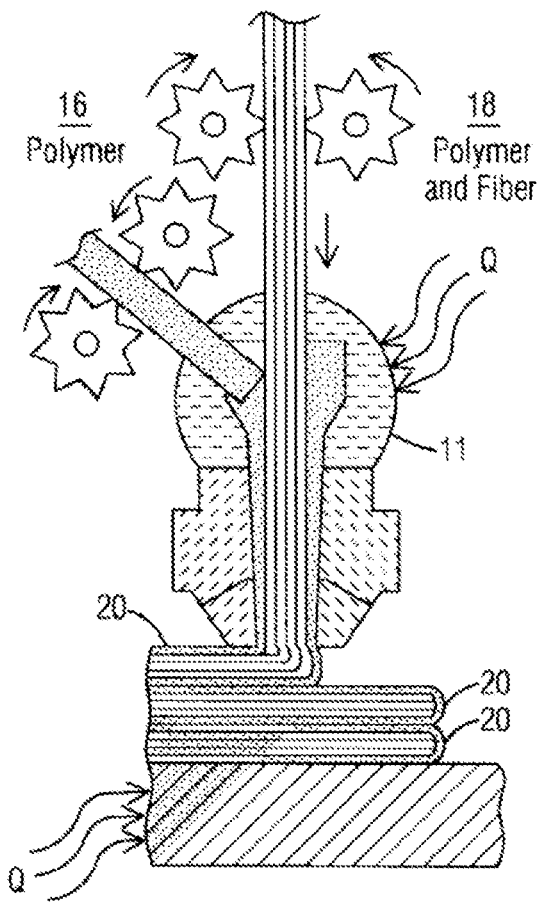
FIG. 21 shows a side schematic cross-sectional view of a nozzle assembly of the integrated robotic 3D printing system showing a polymer coated fiber and polymer being fed into the liquefier to form a composite that can be laid down in accord with the desired orientation.
Figure 22:
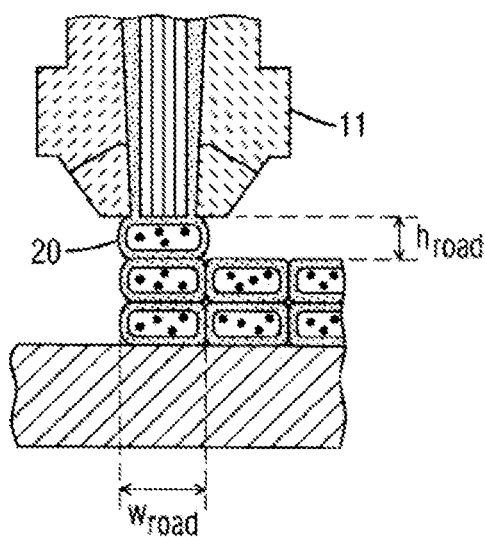
FIG. 22 shows a side schematic cross-sectional view of a nozzle assembly of the integrated robotic 3D printing system taken across line A-A of FIG. 21, showing a polymer coated fiber and polymer being fed into the liquefier to form a composite that can be laid down in accord with the desired orientation.

As stated, the composite material 20 comprises a polymer material 16 and a continuous fiber 18. As shown in FIGS. 21 and 22, it is contemplated that the continuous fiber 18 is discharged in conjunction with the polymer material 20 such that the continuous fiber 18 is at least partially encased within the polymer material 20 to form the composite material 20.

In one aspect, the polymer material 16 can be fed to the liquefier assembly 12 at a temperature at or above the melting point of the polymer material, which allows for the transition of the polymer material from its crystalline state into the viscous flow state. The polymer material can also be fed to the polymer inlet of the liquefier at a desired pressure. In one aspect, the desired pressure is configured to provide motive forces to help urge the polymer material into the melt chamber and into operative contact with the continuous fiber to encapsulate the continuous fiber and to subsequently urge the encapsulated fiber through the nozzle assembly and onto the underlying object. It is contemplated that the heated viscous polymer material allows for the continuous coating or encapsulation of the exterior surface of the continuous fiber to form a partial or continuous coating on the continuous fiber 18 as the composite material exits the nozzle, such that the polymer material bonds with the continuous fiber.

The polymer material 16 can include, without limitation, polymers comprising thermoplastic polymers or thermoset polymers (e.g., polyolefins, polystyrenes, polyvinyl chloride, elastomeric thermoplastics, polycarbonates, polyamides, etc.), and the like. Blends of materials can also be utilized as the polymer materials, e.g., polymer blends. The polymer materials can include additives as are generally known in the art such as, without limitation, dyes or colorants, flow modifiers, stabilizers, nucleators, flame retardants, and so forth.

The polymer material 16 can be combined with a high strength continuous fiber(s) 18 prior to or during formation of the layer. One skilled in the art will appreciate that the high strength continuous fibers can be utilized as individual fibers or as bundles of fibers, e.g., a roving. As used herein, the term "roving" generally refers to a bundle or tow of individual fibers. The fibers contained within the roving can be twisted or can be straight. Although different fibers can be used in a roving, it can be beneficial in some embodiments, if a roving contains a single fiber type to minimize any adverse impact of using fiber types having a different thermal coefficient of expansion. The number of fibers contained in each roving can be constant or vary from roving to roving and can depend upon the fiber type. A roving can include, for instance, from about 500 fibers to about 100,000 individual fibers, or from about 1,000 fibers to about 75,000 fibers, and in some embodiments, from about 5,000 to about 50,000 fibers.

The continuous fiber(s) 18 can possess a high degree of tensile strength relative to their mass. For example, the ultimate tensile strength of the fibers can be about 3,000 MPa or greater. The ultimate tensile strength of the fibers as determined according to ASTM D639 (equivalent to ISO testing method 527) is typically from about 3,000 MPa to about 15,000 MPa, in some embodiments from about 4,000 MPa to about 10,000 MPa, and in some embodiments, from about 5,000 MPa to about 6,000 MPa. Such tensile strengths can be achieved even though the fibers are of a relatively light weight, such as a mass per unit length of from about 0.1 to about 2 grams per meter, in some embodiments from about 0.4 to about 1.5 grams per meter. The ratio of tensile strength to mass per unit length can thus be about 2,000 Megapascals per gram per meter ("MPa/g/m") or greater, in some preferred embodiments about 4,000 MPa/g/m or greater, and, most preferred, from about 5,500 to about 30,000 or 40,000 MPa/g/m.

The high strength continuous fibers 18 can be organic or inorganic fibers. For example, the high strength fibers can be metal fibers (e.g., copper, steel, aluminum, stainless steel, etc.), basalt fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), nanotubes, boron fibers, ceramic fibers (e.g., boron, alumina, silicon carbide, silicon nitride, zirconia, etc.), aramid fibers (e.g., Kevlar™ marketed by E. I. DuPont de Nemours, Wilmington, Del.), synthetic organic fibers (e.g., polyamide, ultra-high molecular weight polyethylene, paraphenylene, terephthalamide, and polyphenylene sulfide), polybenzimidazole (PBI) fibers, and various other natural or synthetic inorganic or organic fibrous materials known for reinforcing compositions. The materials used to form the fibers can include various additives as are known in the art, e.g., colorants, plasticizers, and the like. Carbon fibers are particularly suitable for use as the continuous fibers, which typically have a tensile strength to mass ratio in the range of from about 5,000 to about 7,000 MPa/g/m.

In an optional aspect, it is contemplated that the continuous fiber 18 can comprise a composite filament, which allows for formation of work pieces having a complicated shape that can incorporate continuous filaments in multiple directions and orientations. It is contemplated that such composite filaments can combine the strength and stiffness of continuous filaments (e.g., carbon tows) with the formation flexibility of additive manufacturing formation materials to provide a composite filament capable of successful deposition according to an additive manufacturing process. In this aspect, the composite filaments can include a high-strength continuous fiber in conjunction with a high performance polymer, such as, without limitation, a thermoplastic polymer that exhibits a high glass transition temperature. Such a composite filaments can be utilized as the continuous fiber 18, in the additive manufacturing process and can positively address the stiffness, strength, and environmental performance shortcomings that would be associated with forming such parts with conventional techniques and materials.

While the composite filament can generally incorporate any polymer that may be successfully associated with a continuous fiber, in one embodiment the polymer can be a high performance thermoplastic polymer or a thermoset polymer. High performance polymers that can exemplarily be incorporated in the composite filament can comprise, without limitation, amorphous thermoplastics such as polysulfone (PSU), poly(ethersulfone) (PES), and polyetherimide (PEI), as well as semi-crystalline thermoplastics such as poly(phenylene sulfide) (PPS), polyaryl ether ketones (PAEK) including polyether ketones (PEK) and polyetheretherketone (PEEK), partly aromatic polyamides such as polyphthalamide (PPA), liquid-crystalline polymers (LCP), polyphenylene sulfones (PPSU), as well as blends and copolymers of thermoplastics. Suitable thermoset polymers can include, without limitation, epoxy resins, silicone resins, polyimides, phenolformaldehyde resin, diallyl phthalate, as well as combinations of materials. It will be understood by one of ordinary skill in the art that when considering utilization of a thermoset polymer in formation of the composite filament, it may be beneficial to encourage final cure of the polymer following the additive manufacturing process, so as to improve consolidation of the composite filament in the manufactured structure.

In one particular embodiment, a thermoplastic polymer that exhibits a high glass transition temperature (Tg) can be incorporated in the composite filament. For instance, a thermoplastic polymer having a glass transition temperature of about 150° C. or greater can be dissolved in the solution 2. Exemplary high Tg polymers can include, without limitation, polyethyleneimine (Tg=215° C.), PEI (Tg=217° C.), polyamide-imide (Tg=275° C.), polyarylate (Tg=190° C.), PES (Tg=210° C.-240° C.), polyimide (Tg=250° C.-340° C.), polyphenylene (Tg=158° C.-168° C.), and amorphous thermoplastic polyimide (Tg=247° C.). Other examples of high Tg polymers include those that contain one or more of the following monomers (listed along with a published Tg for the homopolymer): 2-vinyl naphthalene (Tg=151° C.), 2,4,6-trimethylstyrene (Tg=162° C.), 2,6-dichlorostyrene (Tg=167° C.), vinyl carbazole (Tg=227° C.), vinyl ferrocene (Tg=189° C.); acenaphthalene (Tg=214° C.), and methacrylic acid anhydride (Tg=159° C.).

The continuous fibers 18 can generally have a nominal diameter of about 2 micrometers or greater, for instance about 4 to about 35 micrometers, and in some embodiments, from about 5 to about 35 micrometers.

In operation, the continuous fibers 18 are discharged in conjunction with the polymer material 16 during the formation of an individual layer of the additively manufactured product structure such that the continuous fiber is at least partially encased by the polymer material. Any suitable method for combining the materials can be utilized, provided that the continuous fiber is adequately incorporated with the polymer material and bonding between the two materials can occur. The type of bond formed between the continuous fiber and the polymer material can depend upon the two materials involved. For instance a thermal bond, a chemical bond, a friction bond, an electrostatic bond, etc. can be formed between the two materials in order that the high strength continuous fiber is at least partially encased by the polymer material and the two components will be effectively bonded to one another. In some aspects, it is contemplated that both the continuous fiber and the polymer material can be sufficiently heated to promote admixing of the polymer material and continuous fiber to form the composite material.

As will be appreciated from this disclosure, the continuous fiber 18 can be any material having reinforcing characteristics. The continuous fiber 18 can be formed of a plurality of fibers of either the same or differing materials. The polymer material 16 can be formed of one material or an admixture of multiple materials.

In one aspect, in which the continuous fiber 18 comprises a continuous composite filament, the polymer material is feed to melt chamber 40 via the polymer conduit where it flows around and about the composite filament that is feed into the melt chamber via the fiber conduit 18. The pressurized and fluidized polymer material flows downwardly though the melt chamber and becomes conjoined with the continuous composite filament as the polymer forming a portion of the composite filament is likewise heated to a temperature above the melting temperature of the polymer of the composite filament material. Upon combination of the polymer material 16 with the composite filament within the liquefier assembly 12, the polymer material can blend and/or bond with the polymer of the composite filament and the polymer material 16 can form a partial or continuous coating on the composite filament to form the composite material 20. It is contemplated that the polymers can blend to form a monolithic coating about the continuous fiber, which formed a portion of the continuous composite filament. The composite material 20 thus formed can pass through the extrusion tip of the nozzle 14 to the printing surface.

In one exemplary aspect, the polymer material 16 can comprise the same polymer as the polymer that forms a portion of the composite filament. For instance, the composite filament can include a continuous fiber and a high Tg thermoplastic polymer, such as PEI, and the polymer material 16 to be supplied to the liquefier assembly can likewise include PEI. This can improve blending and bonding of the materials in the nozzle assembly in formation of the composite material 20.

In a further aspect, the nozzle assembly can be configured to apply one or multiple coatings of polymer material 16 on the continuous fiber 18, either stacked on the other, overlapping or applied at different positions on the surface of the continuous fiber. Further, the nozzle assembly could be configured to advance several different continuous fibers with different or the same polymer materials, depending on the specifications required for formation of a work piece. In addition, the system could include multiple nozzle assemblies configured to provide either the same or different print media to a work piece, so that different compositions of materials can be used to form the work piece. For example, some nozzle assemblies could be configured to either advance different continuous fibers and/or polymer materials to provide different composition materials to be selectively applied to the work piece. In further or alternative embodiments, some nozzle assemblies can be configured to provide continuous fiber reinforced composite materials, while other nozzle assemblies provide non-reinforced printing media to thereby provide a work piece that has selective reinforced sections.

Discharge of the continuous fiber 18 from the nozzle assembly can be achieved in different manners, depending on the application. In one embodiment, the continuous fiber can be advanced through the nozzle assembly as part of an extrusion process, whereby the continuous fiber is "pushed" or urged through the nozzle assembly. In this embodiment, the continuous fiber is engaged with a driving system, such as a motorized friction drive wheel(s) or a forced air system, to advance the continuous fiber through the nozzle assembly. The continuous fiber enters an input orifice in the nozzle assembly and is advanced toward the nozzle 14 of the liquefier assembly 12. The polymer material 16 is heated above the melting temperature of the polymer material to soften and/or liquefy so as to flow through the nozzle 14 and form at least a partial coating on the continuous fiber 18, as the continuous fiber is advanced from the nozzle assembly and onto the printing surface 22, a mandrel 32, and/or an existing work piece on the print bed 24. By movement of the print bed 24 and/or the mandrel relative to the nozzle assembly, or optionally by movement of the nozzle assembly coupled to the operative end of the robotic armature relative to the work piece, work pieces can be formed by additive application of the composite material 20 onto the printing surface 22, mandrel, and/or existing work piece.

As an alternative to advancing the continuous fiber by pushing or urging the fiber through the nozzle assembly, the continuous fiber 18 can be advanced by a pull-trusion operation, whereby the continuous fiber is drawn or pulled from the tip of the nozzle. In this embodiment, the contact point of the composite material on the printing surface 22 of the print bed 24, an alternative mandrel 32 located on the print bed 24, and/or an existing work piece located on the print bed creates an anchor (e.g., a fixed, contact, gripping point, and the like) that allows for the composite material 20 to be pulled from the nozzle assembly as the print bed 24, mandrel 32, and/or existing work piece is moved relative to the nozzle assembly to form the finished work piece. In this embodiment, using the movement of the print bed and/or mandrel allows for precise control of the advancement of the composite material 20 from the nozzle assembly.

Drawing or "casting on" of the composite material 20 onto the printing surface 22, mandrel 32 and/or existing work piece to begin the printing process can be accomplished by various methods. For example, the composite material 20 could be connected or adhered to a needle or other type structure that can draw the composite material from the nozzle assembly and apply it to the printing surface, mandrel, and/or existing work piece. As an alternative, the nozzle of the nozzle assembly can be brought into contact with the printing surface 22 of the print bed 24, the mandrel 32, and/or the existing work piece so as to contact the composite material 20, whereby either the composite material itself or the polymer material 16 surrounding the continuous fiber 18 in the melted state adheres to the printing surface 22, mandrel 32, and/or the existing work piece creating an anchor for pulling the composite material 20 from the nozzle assembly.

The rate of advancement of the continuous fiber through the nozzle assembly, the temperature of the polymer material, and/or in some instances, the temperature of the printing surface 22 of the print bed 24, the mandrel 32, and/or the existing work piece on the print bed require some level of control to ensure that the continuous fiber 18 receives a consistent/desired coating and that the composite material 20 is applied to either the printing surface 22, mandrel 32, and/or existing work piece in a manner to adhere to same. For example, the temperature of the polymer material 16 and the rate of movement of the print bed and/or mandrel can be controlled to ensure that the composite material 20 is applied in a manner to allow for proper adherence of the composite material 20 to the printing surface 22, mandrel 32, and/or existing work piece. In some instances, the printing surface and/or the mandrel and/or the existing work piece on which the composite material 20 is applied can also or alternatively be temperature controlled for this purpose. In general, the rate of application and temperature of the polymer material 16 on the continuous fiber 18 are controlled to ensure that the coating is applied in a desired manner on the continuous fiber and that the composite material 20 is drawn from the nozzle assembly is a consistent manner.

Tensioning of the composite material can also be required for proper advancement onto the printing surface, mandrel, and/or existing work piece. Tensioning systems can take many forms and be located at different positions in the process to provide proper tensioning of the continuous fiber and/or the composite material. For example, a spool maintaining the continuous fiber could be fitted on a tensioning system, such as a rotational break or clutch that impedes rotation of the spool as continuous fiber is meted from the spool to provide tensioning control. Optionally, the tensioning system can further comprise a tension sensor configured for sensing the tension applied to the continuous fiber 18 being supplied to the liquefier assembly. In this aspect, the tension sensor is in communication with the controller to allow the system 10 to provide selective or automatic feedback control to the tensioning system for maintaining the continuous fiber 18 at a desired tension. Similarly, the nozzle assembly can include a tensioning system, such as restrictive pulleys, clutch, friction element or the like to apply tension to the continuous fiber.

It is also contemplated that the proposed printer could be equipped to perform both "push" and pull-trusion of the continuous fiber to advance the continuous fiber through the nozzle assembly. In this embodiment, there can be drive means associated with the nozzle assembly to advance the continuous fiber through the nozzle assembly assisted by a pulling effect of the movement of the print bed, mandrel, and/or existing work piece on the composite material as it is advanced.

It is contemplated that the relative flow rate (RFP) of the composite material, which is defined as PEI (Polyetherimide) to CF (Carbon Fiber), can be adjusted in combination with adjustments to the nozzle diameter to improve rigidity and/or reduce weight. One skilled in the art will appreciate that it is contemplated that the system 10 can optimize local reinforcement by adding more polymer with the carbon fiber and/or weight can be reduced by extruding less polymer, which again can be locally optimized. In this aspect, the RFP can be between about 15 to about 75, preferably between about 20 to about 60, more preferred between about 25 to 50, and most preferred about 32.

As mentioned above, the composite material 20 can be applied to a mandrel, where the mandrel operates as a form, support and/or pattern of the work piece to be manufactured from the composite material 20. The mandrel aids in shaping of the work piece being printed as the composite material is applied to the mandrel. After printing is complete, and the printed work piece has at least partially cured, the mandrel can be removed from the work piece, such as by eroding, dissolving, breakings, shrinking, or other contemplated procedures for removing either portions of or the entire mandrel.

The above description discloses an embodiment of the system that incorporates both a nozzle assembly capable of advancing a continuous fiber and a print bed for supporting the work piece during printing. Different embodiments of the nozzle assembly and print bed are contemplated. For example, in one aspect, the nozzle assembly can be stationary or operates in two degrees of freedom, while the print bed is moveable with six degrees of freedom. Optionally, the print bed could be stationary or operate in two degrees of freedom, while the nozzle assembly is moveable with six degrees of freedom. In some embodiments, a mandrel can be included on the print bed and be moveable in two or more degrees of freedom. Still further, in other optional embodiments, multiple nozzle assemblies and print beds each with different degrees of freedom may be employed. Alternatively, embodiments are contemplated whereby a system is employed that includes a print bed that is moveable with six degrees of freedom in combination with a traditional 3D nozzle assembly that does not advance a continuous fiber.

It should be emphasized that the above-described embodiments are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual embodiments or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

What is claimed is:

1. A system for printing a three-dimensional object, the system comprising:
    at least one nozzle assembly configured to receive a continuous fiber and a polymer material, wherein the nozzle assembly comprises:
    a liquefier assembly comprising:
        a melt chamber that extends longitudinally along a longitudinal axis of the melt chamber;
        a polymer conduit having a polymer inlet and a polymer outlet, wherein the polymer conduit extends along a polymer longitudinal axis that extends downwardly at an acute angle β with respect to the longitudinal axis of the melt chamber, and wherein the polymer longitudinal axis of the polymer conduit is positioned offset from the longitudinal axis of the melt chamber to provide for a downward cyclonic clockwise motion of the polymer material entering the melt chamber via the polymer outlet about the longitudinal axis of the melt chamber and toward a distal end of the melt chamber; and
        a fiber conduit having a fiber inlet and a fiber outlet, wherein a longitudinal axis of the fiber conduit is co-axial to the longitudinal axis of the melt chamber, wherein the fiber outlet is defined in a proximal end of the melt chamber and the polymer outlet is defined in an interior surface of the melt chamber, and wherein the polymer outlet is spaced proximally from the distal end of the melt chamber and distally from the fiber outlet;
    wherein the polymer material flows into the melt chamber via the polymer outlet at a desired temperature that is at least equal to the melting point of the polymer material and at a desired supply pressure that is configured to provide motive force to urge the polymer material into the melt chamber and into operative contact with the continuous fiber.

2. The system of claim 1, further comprising at least one print bed comprising a printing surface onto which the composite material can be selectively applied from the nozzle to form a work piece.

3. The system of claim 2, wherein the at least one print bed is configured to move in at least six different degrees of freedom, and further comprising:
    one or more drive means connected to the at least one print bed for movement of the at least one print bed in or more of the six different degrees of freedom; and
    a controller in communication with the one or more drive means, wherein the at least one print bed is movable along x, y, z coordinate planes and rotatable about pitch, row, and yaw axes.

4. The system of claim 2, further comprising:
    a robotic armature having an operative end that is configured to move in at least six different degrees of freedom, wherein the nozzle assembly is connected to the operative end; and
    a controller in communication with said one or more dive means,
    wherein the operative end of the robotic armature is movable along x, y, z coordinate planes and rotatable about pitch, row, and yaw axes.

5. The system of claim 1, further comprising a nozzle operably coupled to the liquefier assembly and in fluid communication with the distal end of the melt chamber.

6. The system of claim 5, wherein the melt chamber has a proximal end in communication with the fiber outlet and a distal end that is in communication with a nozzle bore defined in a bottom portion of the liquefier assembly.

7. The system of claim 6, wherein the fiber inlet is defined in an upper surface of the liquefier assembly.

8. The system of claim 6, wherein the nozzle bore extends downwardly coaxial to the longitudinal axis of the melt chamber, and wherein the nozzle bore defines an interior surface that is sized and shaped to receive the nozzle.

9. The system of claim 6, wherein the liquefier assembly further comprises a first internal bore extending substantially transverse to the longitudinal axis of the melt chamber and positioned in a bottom portion of the liquefier assembly proximate to the distal end of the melt chamber and the nozzle bore, and wherein the first internal bore is sized and shaped to operatively receive a nozzle heater cartridge, which is configured, via heat transfer, to heat the areas of the liquefier assembly proximate the nozzle heater cartridge to the desired temperature such that the temperatures in the nozzle bore and melt chamber are maintained at a desired operating temperature.

10. The system of claim 9, wherein the liquefier assembly further comprises a second internal bore extending substantially transverse to the longitudinal axis of the melt chamber and positioned adjacent to the polymer conduit, the fiber conduit, and the proximal end of the melt chamber, and wherein the second internal bore is sized and shaped to operatively receive a preheat heater cartridge, which is configured, via heat transfer, to heat the areas of the liquefier assembly proximate the preheat heater cartridge to the desired temperature such that the temperatures in the polymer conduit, fiber conduit, and melt chamber are maintained at a desired operating temperature.

11. The system of claim 10, wherein the liquefier assembly further comprises at least one thermocouple bore extending substantially transverse to the longitudinal axis of the melt chamber that is configured for receipt of a thermocouple, and wherein the at least one thermocouple bore is spaced from the respective first and second internal bores.

12. The system of claim 11, wherein the at least one thermocouple bore can comprise a nozzle thermocouple bore spaced from the first internal bore and a preheat thermocouple bore that is spaced from the second internal bore, each of the nozzle and preheat thermocouple bores are configured to receive a thermocouple, and wherein the system is configured to provide selectively or automatic feedback control to the respective preheat heater cartridge and/or the nozzle heater cartridge in response to the sensed temperatures to maintain the desired operating temperatures in the liquefier assembly.

13. The system of claim 6, wherein the liquefier assembly further comprises a heater jacket member positioned in overlying relationship thereon at least a portion of an exterior surface of the liquefier assembly, wherein the heater jacket member is configured, via heat transfer, to heat the areas of the liquefier assembly proximate the heater jacket member to the desired temperature such that the temperatures in the nozzle bore and melt chamber are maintained at a desired operating temperature.

14. The system of claim 13, wherein the liquefier assembly has a cylindrical shape, and wherein the heater jacket member circumferentially surrounds at least a portion of the exterior surface of the liquefier assembly.

15. The system of claim 14, wherein the heater jacket member extends longitudinally substantially an elongate length of the liquefier assembly.

16. The system of claim 13, wherein the liquefier assembly further comprises at least one thermocouple bore extending substantially transverse to the longitudinal axis of the melt chamber that is configured for receipt of a thermocouple, and wherein the system is configured to provide selectively or automatic feedback control to the heater jacket member in response to the sensed temperatures to maintain the desired operating temperatures in the liquefier assembly.

17. The system of claim 6, wherein the nozzle defines a nozzle conduit that extends longitudinally from a proximal end to a distal end, which defines the nozzle, wherein at least a portion of the exterior surface of the proximal end of the nozzle can be selectively treaded to be complementarily received within the nozzle bore of the liquefier assembly such that the nozzle conduit is placed into fluid communication with the distal end of the melt chamber, and wherein the nozzle conduit extends substantially coaxial to the longitudinal axis of the melt chamber.

18. The system of claim 17, wherein the nozzle conduit is inwardly tapered proximate the proximal end of the nozzle conduit to reduce the diameter of the nozzle conduit to a second diameter, wherein the second diameter is less than the diameter of the melt chamber, and wherein diameter of the nozzle conduit tapers inwardly in a convergent zone in which the diameter of the nozzle conduit is reduced from the second diameter to a third diameter as the nozzle conduit approaches the distal end of nozzle.

19. The system of claim 17, wherein an edge of the nozzle of the nozzle conduit has a chamfered or otherwise rounded cross-sectional shape.

20. The system of claim 1, wherein the nozzle assembly is configured to at least partially encase the continuous fiber with the polymer material to create a composite material.

21. The system of claim 1, wherein the polymer inlet is in communication with a source of polymer material, and wherein the fiber inlet is in communication with a source of the continuous fiber.

22. The system of claim 1, wherein the polymer longitudinal axis is offset from the longitudinal axis a distance proximate to the radius of a diameter of the fiber conduit.

23. The system of claim 1, wherein the polymer longitudinal axis is offset from a plane bisecting the longitudinal axis of the melt chamber at an acute angle.

24. The system of claim 1, wherein a distal end of the polymer conduit is defined in the interior surface of the melt chamber proximate a middle juncture of the melt chamber.

25. A system for printing a three-dimensional object, the system comprising:
a liquefier assembly comprising:
a melt chamber that extends longitudinally along a longitudinal axis of the melt chamber;
a polymer conduit configured to receive a polymer material, the polymer conduit having a polymer inlet and a polymer outlet, wherein the polymer conduit extends along a polymer longitudinal axis that extends downwardly at an acute angle β with respect to the longitudinal axis of the melt chamber, wherein the polymer longitudinal axis of the polymer conduit is positioned offset from the longitudinal axis of the melt chamber to provide for a downward cyclonic clockwise motion of the polymer material entering the melt chamber via the polymer outlet about the longitudinal axis of the melt chamber and toward a distal end of the melt chamber, and wherein the polymer longitudinal axis can be offset from a plane bisecting the longitudinal axis of the melt chamber at an acute angle; and a fiber conduit configured to receive a continuous fiber, the fiber conduit having a fiber inlet and a fiber outlet, wherein a longitudinal axis of the fiber conduit is co-axial to the longitudinal axis of the melt chamber, wherein the fiber outlet is defined in a proximal end of the melt chamber and the polymer outlet is defined in an interior surface of the melt chamber, and wherein the polymer outlet is spaced proximally from the distal end of the melt chamber and distally from the fiber outlet; and a nozzle that is configured to be in fluid communication with a distal end of the melt chamber of the liquefier assembly, wherein the polymer material flows into the melt chamber via the polymer outlet at a desired temperature that is greater than the melting point of the polymer material and at a desired supply pressure that is configured to provide motive force to urge the polymer material into the melt chamber and into operative contact with the continuous fiber to at least partially encase the continuous fiber with the polymer material to create a composite material.

26. A system for printing a three-dimensional object, the system comprising:

a liquefier assembly comprising:

a melt chamber that extends longitudinally along a longitudinal axis of the melt chamber;

a polymer conduit configured to receive a polymer material, the polymer conduit having a polymer inlet and a polymer outlet, wherein the polymer conduit extends along a polymer longitudinal axis that extends downwardly at an acute angle β with respect to the longitudinal axis of the melt chamber, and wherein the polymer longitudinal axis of the polymer conduit is positioned offset from the longitudinal axis of the melt chamber to provide for a downward cyclonic clockwise motion of the polymer material entering the melt chamber via the polymer outlet about the longitudinal axis of the melt chamber and toward a distal end of the melt chamber; and a fiber conduit configured to receive a continuous fiber, the fiber conduit having a fiber inlet and a fiber outlet, wherein a longitudinal axis of the fiber conduit is co-axial to the longitudinal axis of the melt chamber, wherein the fiber outlet is defined in a proximal end of the melt chamber and the polymer outlet is defined in an interior surface of the melt chamber, and wherein the polymer outlet is spaced proximally from the distal end of the melt chamber and distally from the fiber outlet;

wherein the polymer material flows into the melt chamber via the polymer outlet at a desired temperature that is at least equal to the melting point of the polymer material and at a desired supply pressure that is configured to provide motive force to urge the polymer material into the melt chamber and into operative contact with the continuous fiber.

27. The system of claim 26, wherein the liquefier assembly is configured to at least partially encase the continuous fiber with the polymer material to create a composite material.

28. The system of claim 26, wherein the polymer inlet is in communication with a source of polymer material, and wherein the fiber inlet is in communication with a source of the continuous fiber.

29. The system of claim 26, wherein the polymer longitudinal axis is offset from the longitudinal axis a distance proximate to the radius of a diameter of the fiber conduit.

30. The system of claim 26, wherein the polymer longitudinal axis is offset from a plane bisecting the longitudinal axis of the melt chamber at an acute angle.

31. The system of claim 26, wherein a distal end of the polymer conduit is defined in the interior surface of the melt chamber proximate a middle juncture of the melt chamber.

32. The system of claim 26, further comprising a nozzle operably coupled to the liquefier assembly and in fluid communication with the distal end of the melt chamber.

33. The system of claim 32, further comprising at least one print bed comprising a printing surface onto which the composite material can be selectively applied from the nozzle to form a work piece.

34. The system of claim 33, wherein the at least one print bed is configured to move in at least six different degrees of freedom, and further comprising:

one or more drive means connected to the at least one print bed for movement of the at least one print bed in or more of the six different degrees of freedom; and a controller in communication with the one or more drive means, wherein the at least one print bed is movable along x, y, z coordinate planes and rotatable about pitch, row, and yaw axes.

35. The system of claim 33, further comprising:

a robotic armature having an operative end that is configured to move in at least six different degrees of freedom, wherein the nozzle assembly is connected to the operative end; and a controller in communication with said one or more dive means, wherein the operative end of the robotic armature is movable along x, y, z coordinate planes and rotatable about pitch, row, and yaw axes.

36. The system of claim 32, wherein the melt chamber has a proximal end in communication with the fiber outlet and a distal end that is in communication with a nozzle bore defined in a bottom portion of the liquefier assembly.

37. The system of claim 36, wherein the fiber inlet is defined in an upper surface of the liquefier assembly.

38. The system of claim 36, wherein the nozzle bore extends downwardly coaxial to the longitudinal axis of the melt chamber, and wherein the nozzle bore defines an interior surface that is sized and shaped to receive the nozzle.

39. The system of claim 36, wherein the liquefier assembly further comprises at least one internal bore that is sized and shaped to operatively receive a heater cartridge, which is configured, via heat transfer, to heat the areas of the liquefier assembly proximate the heater cartridge to the desired temperature.

40. The system of claim 39, wherein the liquefier assembly further comprises at least one thermocouple bore extending substantially transverse to the longitudinal axis of the melt chamber that is configured for receipt of a thermocouple, and wherein the at least one thermocouple bore is spaced from the at least one internal bore.

41. The system of claim 36, wherein the liquefier assembly further comprises a heater jacket member positioned in overlying relationship thereon at least a portion of an exterior surface of the liquefier assembly, wherein the heater jacket member is configured, via heat transfer, to heat the areas of the liquefier assembly proximate the heater jacket member to the desired temperature such that the temperatures in the nozzle bore and melt chamber are maintained at a desired operating temperature.

42. The system of claim 41, wherein the liquefier assembly further comprises at least one thermocouple bore extending substantially transverse to the longitudinal axis of the melt chamber that is configured for receipt of a thermocouple, and wherein the system is configured to provide selectively or automatic feedback control to the heater sleeve member in response to the sensed temperatures to maintain the desired operating temperatures in the liquefier assembly.

43. The system of claim 36, wherein the nozzle defines a nozzle conduit that extends longitudinally from a proximal end to a distal end, which defines the nozzle, wherein at least a portion of the exterior surface of the proximal end of the nozzle can be selectively treaded to be complementarily received within the nozzle bore of the liquefier assembly such that the nozzle conduit is placed into fluid communication with the distal end of the melt chamber, and wherein the nozzle conduit extends substantially coaxial to the longitudinal axis of the melt chamber.

44. The system of claim 43, wherein the nozzle conduit is inwardly tapered proximate the proximal end of the nozzle conduit to reduce the diameter of the nozzle conduit to a second diameter, wherein the second diameter is less than the diameter of the melt chamber, and wherein diameter of the nozzle conduit tapers inwardly in a convergent zone in which the diameter of the nozzle conduit is reduced from the second diameter to a third diameter as the nozzle conduit approaches the distal end of nozzle.

45. The system of claim 43, wherein an edge of the nozzle of the nozzle conduit has a chamfered or otherwise rounded cross-sectional shape.

46. A system for printing a three-dimensional object, the system comprising:
at least one nozzle assembly configured to receive a continuous fiber and a polymer material, wherein the nozzle assembly comprises:
a liquefier assembly comprising:
a melt chamber that extends longitudinally along a longitudinal axis of the melt chamber;
a polymer conduit having a polymer inlet and a polymer outlet, wherein the polymer conduit extends along a polymer longitudinal axis that extends downwardly at an acute angle β with respect to the longitudinal axis of the melt chamber, and wherein the polymer longitudinal axis of the polymer conduit is positioned offset from the longitudinal axis of the melt chamber to provide for a downward cyclonic clockwise motion of the polymer material entering the melt chamber via the polymer outlet about the longitudinal axis of the melt chamber and toward a distal end of the melt chamber; and
a fiber conduit having a fiber inlet and a fiber outlet, wherein a longitudinal axis of the fiber conduit is co-axial to the longitudinal axis of the melt chamber, wherein the fiber outlet is defined in a proximal end of the melt chamber and the polymer outlet is defined in an interior surface of the melt chamber, and wherein the polymer outlet is spaced proximally from the distal end of the melt chamber and distally from the fiber outlet;
wherein the polymer material flows into the melt chamber via the polymer outlet at a desired temperature and at a desired supply pressure that is configured to provide motive force to urge the polymer material into the melt chamber and into operative contact with the continuous fiber.

* * * * *